United States Patent Office 3,408,293
Patented Oct. 29, 1968

3,408,293
COAL SLURRY CLARIFICATION
Mahmoud T. Dajani, Park Forest, John D. Ingraham, Lyons, and Walter F. Lorenc, Harvey, Ill., assignors to Nalco Chemical Company, Chicago, Ill., a corporation of Delaware
No Drawing. Filed Apr. 11, 1966, Ser. No. 541,494
4 Claims. (Cl. 210—53)

This invention relates to an improved method for removing coal fines and clay from an aqueous suspension thereof. More particularly, the process comprises the sequential addition of an anionic polymer followed by a cationic polymer to coal wash waters under specific conditions to produce a clear aqueous supernate.

Water clarification plays a major role in the economics of coal preparation plants. By their very nature, these plants are many times operated on a closed system basis; that is, the water used to wash the raw coal is recycled for reuse. Since the water used to wash the raw coal serves primarily to remove coal fines and clays mixed with the raw coal, it is of primary importance that the water be relatively clear and contain only very minor amounts of suspended solids. Otherwise, immense volumes of water would be necessary to process the coal.

Oftentimes, the coal fines and clay which are removed from the spent wash water are used as filler materials and other purposes for which inexpensive inert materials can be employed. Accordingly, it is essential that the process of removing the coal fines and suspended clay from the wash water be as low in cost as possible to enhance the economics of the subsequent use of the solids.

Considerable effort has been spent by the coal preparation industry to develop an economical and efficient process for removing coal fines and suspended clay from the spent wash waters. Prior art attempts to optimize this process have led to the use of various anionic and cationic materials. Anionic polymers have long been used to coagulate the coal particles, although these materials are generally incapable of removing suspended clay particles.

The clay particles in most spent wash waters in coal processing plants are colloidal in size and are stabilized by a double layer repulsion of electric charge. The use of cationic polymers has also been common in the industry since these materials are effective in removing suspended clay by counteracting the negative double layer charge of the colloidal clay particles. Again, however, this system has one substantial drawback in that the cationic materials are ineffective in removing the suspended coal particles which must be flocculated to increase the settling rate and permit processing of reasonably large volumes of water per unit time. Furthermore, the expense of using the large amount of cationic coagulant necessary for good results is far too great to be considered a satisfactory solution to the problem at hand. Ideally, a process which would provide reasonably rapid settling of the coal particles concomitant with realization of sufficiently clear supernatant liquids would find great use in the coal processing art and would meet with wide acceptance by the industry.

Recently, a method has been proposed for related industries such as sewage treatment which contemplated the use of a dual polymer system wherein both cationic polymer and an anionic polymer are employed in the treatment of sewage, mineral ores and other typical coagulation problem areas. Such a solution to the problem of general coagulation efficiencies is tendered in Canadian Patent No. 637,703. However, it has now been discovered that even with the use of a combination of such chemicals, further process variables must be followed to reach optimum efficiency of coal wash water clarification. To maximize efficiency of operation in terms of clarity of supernatant liquid and controlled rate of sedimentation, certain process techniques must be carefully carried out. In view of the above, it therefore becomes an object of this invention to provide an improved method of clarifying coal wash water systems.

A more specific object of the invention is to provide a method for optimizing the efficiency of spent coal wash water clarification.

A still further object of the invention is to provide a method for clarifying coal wash water by flocculation and settling of the finely-divided coal fines and suspended clay in aqueous suspension to allow efficient reuse of the supernatant liquid in further washing raw coal.

Other objects will appear hereinafter.

In accordance with the invention, it has now been discovered that an improved process for removing coal fines and clay from an aqueous suspension thereof may be optimized by the sequential addition of an anionic polymer followed by a cationic polymer to the aqueous suspension. The amount of anionic polymer must be sufficient to form a floc, but must be less than that amount which agglomerates the flocs into rapidly settling particles. Also, the amount of cationic polymer is critical, that amount being sufficient to counterbalance the product of the amount of clay present in the suspension multiplied by the critical mobility of that clay. A more precise definition of the necessary amounts of the respective additions is set out in greater detail hereinafter.

Anionic polymers

Coagulants falling within the anionic class are those consisting of substances which in an aqueous medium will form organic anions having a measurable negative electric charge. Greatly preferred anionic materials are those substances polymeric in nature having a substantial number of negative electrical charges distributed at a plurality of positions on the polymer. These polymeric anionic substances which generally have a molecular weight of at least 100,000 when formed as addition-type polymers or copolymers are derived by polymerization of at least one mono-olefinic compound through an aliphatic unsaturated group. These polymers should be water-dispersible and have a structure substantially free of cross linkage and are therefore available for solubilization or dispersion in the particular aqueous turbid liquid being treated. Preferred anionic substances found to be especially effective for the purpose of the invention are water-dispersible synthetic polymers having a linear hydrocarbon structure and containing in a side chain a hydrophilic group selected from the class consisting of carboxylic acid, carboxylic acid anhydride, carboxylic acid salt groups, and copolymers of any of the foregoing. Typical water-dispersible synthetic organic polymers, anionic in nature, which have these characteristic groupings are listed below. These have been found to be effective for the practice of the invention.

| No. | Name | Characteristic Grouping |
|---|---|---|
| 1 | Polyacrylate-sodium salt. | $-CH_2-CH-$<br>$\phantom{-CH_2-}\vert$<br>$\phantom{-CH_2-}COO(-)$<br>$\phantom{-CH_2-}Na(+)$ |
| 2 | Polymethacrylic acid-sodium salt. | $\phantom{-CH_2-}CH_3$<br>$\phantom{-CH_2-}\vert$<br>$-CH_2-C-$<br>$\phantom{-CH_2-}\vert$<br>$\phantom{-CH_2-}COO(-)$<br>$\phantom{-CH_2-}Na(+)$ |
| 3 | Maleic anhydride-vinyl acetate copolymer. | $-CH-CH_2-CH-\!-\!-CH-$<br>$\phantom{--}\vert \phantom{-CH_2-}\vert \phantom{---}\vert$<br>$\phantom{--}O \phantom{-CH_2}O=C \phantom{--} C=O$<br>$CH_3C=O \phantom{-CH_2----}\diagdown\!\diagup$<br>$\phantom{CH_3C=O-CH_2---}O$ |
| 4 | Polyvinyl methyl ether-maleic anhydride copolymer. | $-CH-CH_2-CH-\!-\!-CH-$<br>$\phantom{--}\vert \phantom{-CH_2-}\vert \phantom{---}\vert$<br>$\phantom{--}OCH_3 \phantom{-}O=C \phantom{--} C=O$<br>$\phantom{CH_3C=O-CH_2---}\diagdown\!\diagup$<br>$\phantom{CH_3C=O-CH_2---}O$ |
| 5 | Methacrylic acid-acrylamide copolymer. | $\phantom{-CH_2-}CH_3 \phantom{---} CH_3$<br>$\phantom{-CH_2-}\vert \phantom{-----}\vert$<br>$-CH_2C-\!-\!CH_2-C-$<br>$\phantom{-CH_2-}\vert \phantom{-----}\vert$<br>$\phantom{-CH_2-}COO(-) \phantom{-}CONH_2$<br>$\phantom{-CH_2-}H(+)$ |
| 6 | Polyacrylic acid | $-CH_2-CH-$<br>$\phantom{-CH_2-}\vert$<br>$\phantom{-CH_2-}COO(-)$<br>$\phantom{-CH_2-}H(+)$ |
| 7 | Isopropenyl acetate-maleic anhydride sodium salt. | $\phantom{CH_2-}CH_3$<br>$\phantom{CH_2-}\vert$<br>$CH_2-C-\!-\!-\!-CH-\!-\!-\!-CH$<br>$\phantom{CH_2-}\vert \phantom{-------}\vert \phantom{----}\vert$<br>$\phantom{CH_2-}O \phantom{-----} C=O \phantom{-} C=O$<br>$CH_2C=O \phantom{--} O(-) \phantom{--} O(-)$<br>$\phantom{CH_2C=O--} Na(+) \phantom{-} Na(+)$ |
| 8 | Itaconic acid-vinyl acetate. | $\phantom{-}COO(-)H(+)$<br>$\phantom{-}\vert$<br>$-C-CH_2-CH_2-CH-$<br>$\phantom{-}\vert \phantom{-------------}\vert$<br>$CH_2COO(-) \phantom{---} O$<br>$\phantom{-----}\vert$<br>$H(+) \phantom{---} CH_3C=O$ |
| 9 | α-methyl styrene-maleic anhydride sodium salt. | $\phantom{-}CH_3$<br>$\phantom{-}\vert$<br>$-C-CH_2-CH-\!-\!-\!-CH-$<br>$\phantom{-}\vert \phantom{-------}\vert \phantom{----}\vert$<br>$\phantom{---}COO(-) \phantom{-} COO(-)$<br>$\phantom{---}\bigcirc\!\!\!\diagup\!\!\!\diagdown$ (phenyl)<br>$\phantom{---}Na(+) \phantom{---} Na(+)$ |
| 10 | Styrene-maleic anhydride sodium salt. | $-CH-CH_2-CH-\!-\!-\!-CH-$<br>$\phantom{-CH-CH_2-CH-}\vert \phantom{----}\vert$<br>$\phantom{-CH-CH_2-CH-}COO(-) \phantom{-} COO(-)$<br>$\phantom{-CH-CH_2-CH-}Na(+) \phantom{---} Na(+)$ |
| 11 | Methylmethacrylate-maleic anhydride sodium salt. | $\phantom{-}CH_3$<br>$\phantom{-}\vert$<br>$-C-CH_2-\!-\!CH-\!-\!-\!-CH-$<br>$\phantom{-}\vert \phantom{--------}\vert \phantom{----}\vert$<br>$COOCH_3 \phantom{-} COO(-) \phantom{-} COO(-)$<br>$\phantom{COOCH_3---}Na(+) \phantom{-----} Na(+)$ |
| 12 | Acrylic acid-styrene copolymer. | $-CH-CH_2-CH-CH_2-$<br>$\phantom{-CH-CH_2-}\vert$<br>$\phantom{-CH-CH_2-}COO(-)$<br>$\phantom{-CH-CH_2-}H(+)$ |

A suitable anionic copolymer may be derived from a polycarboxylic acid monomer and at least one other monomer copolymerizable therewith. The polycarboxylic acid may be maleic anhydride, acrylic acid, maleic acid, fumaric acid, itaconic acid, aconitic acid, citraconic acid, etc., which may be copolymerized with the amides of these acids, the alkali metal derivatives (e.g., sodium, potassium and lithium), the alkaline earth metal derivatives (e.g., magnesium, calcium, barium and strontium), mono- and ammonium salts of these acids, the partial alkyl esters (e.g., methyl, ethyl, propyl, butyl, mono esters), the salts of said partial alkyl esters, and the substituted amides of these polycarboxylic acids or a variety of other different monomers. Where a hydrophilic polycarboxylic acid such as maleic acid is used as one of the starting components to form the copolymer, a hydrophobic comonomer may be used, as for example, styrene, alpha-methylstyrene, vinyl toluene, chlorostyrene, vinyl acetate, vinyl chloride, vinyl formate, vinyl alkyl ethers, alkyl acrylates, alkyl methacrylates, ethylene, propylene, and/or isobutylene. The foregoing synthetic copolymers are preferably obtained by reacting equimolar proportions of a polycarboxylic acid and at least one other monomer. However, certain of the unsaturated polycarboxylic acids can be polymerized in less than equimolar proportions with some of the less hydrophobic comonomers.

A variety of other anionic polymeric substances may be employed such as hydrolyzed polyacrylonitrile-sodium salt thereof, sodium carboxymethyl cellulose, the sodium salt of an acid-ester of starch, the sodium salt of a sulfonated polystyrene, phosphorylated starches, such as those obtained by treating corn starch with phosphorous oxychloride in pyridine, anionic polysaccharides, and combinations of any of the above or other anionic coagulant materials.

Another class of anionic materials particularly suitable in the practice of the invention are copolymers of sodium acrylate and acrylamide. The most preferred copolymers of this type comprise 5–95% by weight of sodium polyacrylate and 5–95% by weight of polyacrylamide and have a molecular weight in excess of 100,000. Other polymers or copolymers of acrylic acid types are particularly preferred and are typified by those obtained by vinyl polymerization of acrylic acid, methacrylic acid, sulfoethyl acrylate, carboxyethyl acrylate or salts thereof or copolymers thereof of the acids or salts obtained by suitable copolymerization with monomers such as acrylamide, methacrylamide, acrylonitrile, methacrylonitrile, lower alkyl esters, alkyl esters of the acrylic acids, vinyl alkyl ethers, and the like.

Another greatly preferred class of anionic polymers is a linear high molecular weight polymer or copolymer of a vinyl aryl hydrocarbon, such as styrene, vinyl toluene, alpha-methylstyrene, vinyl xylene or the like, which are polymerized and then sulfonated under controlled conditions to produce a water-soluble substantially linear polymer sulfonate.

As mentioned above, one of the most preferred anionic coagulants falling within the scope of the invention are copolymers of polyacrylate sodium salt and polyacrylamide of varying proportions of the respective monomers. The examples below illustrate typical preparations of these particularly useful anionic copolymers.

EXAMPLE I

This example illustrates a typical preparation of an anionic copolymer useful in the invention. The copolymeric product contained 85 mole percent acrylamide and 15 mole percent sodium salt of acrylic acid.

27 parts of acrylic acid were dissolved in 72 parts of water. 56 parts by weight of a 50% solution of sodium hydroxide were added to the acrylic acid solution at a temperature below 35° C. The pH of the solution at this point was approximately 7–9. 153 parts by weight of acrylamide were then added to the solution and mixed until thoroughly dissolved at a temperature of 20–30° C. 72 parts of additional water were added and the monomer pH adjusted to approximately 8.5. In the reaction vessel itself, 575.0 parts by weight of toluene and 19.6 parts by weight of sorbitan monooleate were dissolved and heated to 70° C. 7.8 parts of a 1% aqueous solution of potassium persulfate were added with stirring to the monomer solution. This was followed by addition of 3.2 parts of a 1% solution of sodium metabisulfite. The monomer solution containing the above redox catalyst system was added to the toluene solution and temperature increased to 75° C. The atmosphere above the reaction vessel was purged with nitrogen and an exothermic reaction then took place. After the exothermic reaction ceased, the mixture was cooled to 63° C. While still under a nitrogen purge, 15.6 parts of a 1.15% solution of azobisisobutyronitrile in toluene was added to the reaction mixture. The nitrogen purge was continued at 63° C. until another exothermic reaction was completed. The completion of this second exothermic reaction occurred approximately 30 minutes after its initiation. Water was then distilled out of the reaction vessel by an azeotropic distillation technique, and the product isolated by filtration. A 1% solution of the resultant copolymer had a viscosity of 4200 cps.

EXAMPLE II

This example illustrates preparation of another representative anionic copolymer. The particular copolymer was comprised of 30 mole percent sodium acrylate monomer and 70 mole percent acrylamide.

27 parts by weight of acrylic acid was dissolved in 72 parts by weight of water and cooled to a temperature below 35° C. The above solution temperature was maintained while neutralization with sodium hydroxide was effected. 30 parts by weight of a 50% solution of sodium hydroxide was necessary to carry out this step. A solution pH of 7–9 was reached after neutralization.

63 parts by weight of acrylamide were then added to the above solution and mixed until dissolved at a solution temperature of 20–30° C. 33 additional parts by weight of water were added and the pH of the monomer solution adjusted to 8.5. 0.8 part of a 1% solution of potassium persulfate were added with stirring to the monomer solution. This was followed by addition of 3.2 parts of a 1% solution of sodium metabisulfite. Into the reaction vessel itself was added 575.0 parts by weight of toluene and 19.6 parts by weight of sorbitan monooleate non-ionic emulsifier. To the toluene solution was added the monomer solution and the temperature increased to 75° C. The reaction vessel was purged with nitrogen and an exothermic reaction was then initiated. After the exothermic reaction had ceased, the mixture was cooled to 63° C. and additional catalyst was added. Specifically, 15.6 parts of a 1.15% solution of azobisisobutylronitrile in toluene solution was added to the reaction mixture. The nitrogen purge was continued and temperature held at 63° C. until another exothermic reaction was completed (approximately 30 minutes after initiation). After the second exothermic reaction, water was distilled off by azeotropic distillation, and the solid product isolated by filtration. A 1% solution of the final copolymeric composition had a viscosity of 22,500 cps.

EXAMPLE III

This example illustrates preparation of yet another typical copolymer of the anionic type. The product copolymer was comprised of 52 mole percent acrylamide and 48 mole percent sodium salt of acrylic acid.

A monomer solution was made as follows:

234.72 pounds of soft water was added to 4.8 pounds of acrylic acid. 28.56 pounds of a 50% solution of sodium hydroxide was then added to the acrylic acid solution while maintaining the solution temperature below 95° F. with external cooling water to prevent premature polymerization and cross linking. When the pH of the solution reached 7–8, 27.0 pounds of acrylamide was added to the monomer solution and dissolved by heating with steam at 68° F. and allowed to mix for 3–5 minutes. The above monomer solution was added to a reaction vessel containing 38.7 pounds of toluene and 3.2 pounds of sorbitan monooleate non-ionic emulsifier. The reaction mixture was heated to 155° F. and purged with nitrogen. At this point, an exothermic reaction was initiated at approximately a 167° F. reaction temperature. Thirty minutes after the initial exotherm the reaction was considered complete. The reaction mixture was then heated with steam to 190° F. in order to distill off water by an azeotropic technique. The reactor was then cooled, toluene stripped off, and solid copolymer removed. A 1% aqueous solution of the copolymeric product had a viscosity of 23,000 cps.

EXAMPLE IV

In this example, a copolymeric product was prepared which contained 95 mole percent acrylic acid salt and 5 mole percent acrylamide.

To 17.4 pounds of water was added 11.4 pounds of acrylic acid which was then neutralized with 12.35 pounds of 50% solution sodium hydroxide until a pH of 8.3 was reached. The neutralization was carried out at a temperature below 30° C. 0.6 pound of acrylamide were then added, and the monomer solution makeup completed by addition of .276 pound of potassium persulfate and 1.1 pounds of sodium bisulfite. The monomer solution was then added to a reaction vessel containing 100 pounds of toluene and 3.4 pounds of a non-ionic emulsifier. The polymerization reaction was carried out at a temperature ranging from about 70° C. to about 100° C. At the end of the reaction, water was removed by azeotropic distillation and a solid product recovered. A 1% solution of the product had a viscosity of 30,500 c.p.s.

Again, other anionic coagulants than those specifically described above may be utilized just as effectively for purposes of the instant invention. The above are meant to merely illustrate typical anionic-type materials.

Cationic polymers

As is discerned from the discussion above, a wide variety of cationic treating agents may be suitably employed in the invention. Generally, such materials usually have sufficient strength of ionization to form salts with alkali cations in aqueous media. The following materials are just a few of the typical cationic substances which may be suitably employed in practice of the invention.

One preferred cationic class of materials is a polymeric polyamine substance. Generally, these polymers have molecular weights in excess of 1,000 and more preferably in excess of 2,000. The most preferred polymers of this type have molecular weight ranges of 2,000–50,000. Such above polymeric polyamines may be formed by a wide variety of reactions such as by the reaction of alkylene polyamines and difunctional alkyl materials.

A greatly preferred class of polyamine polymers are condensation polymers of alkylene polyamines and halohydrins. Exemplary polymers of this type are those disclosed in Green, U.S. Patent 2,969,302, the disclosure of which is incorporated herein by reference.

A preferred polyamine condensation polymer of the type described in Green, U.S. Patent 2,969,302, is generically defined as an aqueous solution containing 5–40% by weight of a high molecular weight epihalohydrin-alkylene polyamine condensation copolymer, said aqueous solution being further characterized as having a viscosity of at least 10 c.p.s., when measured as an aqueous solution containing 20% by weight of said condensation copolymer at 75° F. Preferred materials falling within this class have a viscosity of at least 50 c.p.s. when measured as just described. The upper limit of the viscosity is anything short of gel formation. Most preferred products have viscosities of from about 50 to about 800 c.p.s. In order to form the preferred polymers of the invention, it is only necessary to polymerize the epihalohydrin and alkylene polyamine at temperatures ranging from about 105° F. to 185° F. at a mole ratio of epihalohydrin to alkylene polyamine falling within the range of 1.4:1 to 2.2:1. For best results, the polymerization reaction is generally carried out in dilute aqueous solutions at reactant concentrations ranging from about 10 to about 30% by weight.

As mentioned above, the two classes of monomeric reactants involved in the condensation polymerization are epihalohydrins and alkylene polyamines. The epihalohydrins that may be employed include such materials as epichlorohydrin, epibromohydrin, and epiiodohydrin. Of these, the most preferred, due to cost and ready availability, is epichlorohydrin.

The alkylene polyamines which are reacted with the polyfunctional halohydrin for the purpose of the invention are well-known compounds having the general formula:

$$H_2N(CnH_{2n}NH)_xH$$

where $n$ is an integer from 1 to 4 and $x$ is one or more. Preferably, $n$ is 2 and $x$ ranges from 1 to 5 to give the preferred polyethylene polyamine class. Examples of alkylene polyamines useful in the invention are the alkylene diamines, such as ethylene-diamine, 1,2-propylene diamine, 1,3-propylene diamine, and the polyalkylene polyamines, such as, for example, diethylene triamine, triethylene tetramine, tetraethylene pentamine, pentaethylene hexamine, dipropylene triamine, and the similar polypropylene polyamines and polybutylene polyamines. Mixtures of any of the above may also be used and oftentimes commercial sources of these compounds contain two or more of any of the above alkylene polyamines. Some commercial amine products may contain mixtures of as many as five separate compounds.

Yet another species of polyamines falling within the above class is formed by reaction of an alkylene dihalide and an amine. Preferred amine reactants include ammonia, ethylene diamine, diethylene triamine, tetraethylene pentamine and triethylene pentamine. Of these, the most preferable due to excellent reactivity, low cost and availability is ammonia. The alkylene dihalide reactant may be chosen from a wide variety of difunctional organics including ethylene dichloride and 1,2-propylene dichloride. Of these the most preferred is ethylene dichloride. One excellent cationic polymer for use in the instant invention is formed by reaction of ammonia and ethylene dichloride under super-atmospheric pressures and with heating.

In addition to the above preferred condensation type polymers, many other condensation polymeric cationics are also admirably suited for use in the invention. Effective water-soluble cationic polymers or resins are to be found among the class consisting of amine-aldehyde resins and amide-aldehyde resins, preferably hydrophilic melamine-formaldehyde resins. Such colloidal cationic resin solutions may be prepared by dissolving ordinary melamine-aldehyde condensation products, such as methylol melamines, in acids such as hydrochloric acid, to form acidified or acid-type resin solutions having a glass electrode pH value within the range of about 0.5 to about 3.5 when measured at 15% solids, or pH values up to 4.5 when measured in more dilute solutions, followed by aging to the colloidal condition, as described in U.S. Patent 2,345,543.

Another class of cationic melamine-aldehyde resins that may be used in practicing the present invention are the resinous polymers of melamine, urea and aldehydes such as formaldehyde containing at least 0.7 mole of melamine for each 4 moles of urea and about 1 to 4 moles of combined formaldehyde for each mole of melamine plus urea. Such resins are described in U.S. Patent 2,485,079. These cationic melamine resin copolymers are obtained by first preparing an acidified aqueous solution of an aldehyde condensation product of melamine and urea containing 1 to 70 mole percent of urea and 30 to 99% of melamine and about 0.2 to 1.5 moles of acid per mole of melamine, depending on the strength of the acid, and aging the solution until the colloidal cationic condition is reached.

Another suitable class of cationic coagulants are those of the polyimine type. The polyimines are derived, for example, by the homopolymerization of monomers containing the imine radical,

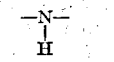

and have a molecular weight of at least 1000.

The imine monomers preferably employed contain not more than 7 carbon atoms. Of the monomers employed for making polyimines, some of those best suited for the purpose of the invention are classified as substituted ethyleneimines and have the structural formula:

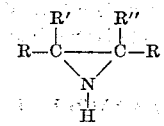

wherein R, R', R'' are either hydrogen or acyclic hydrocarbon radicals containing from 1 to 3 carbon atoms.

Examples of such monomers are the following:

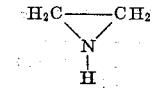

A. Ethyleneimine

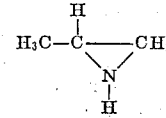

B. 1,2-propyleneimine

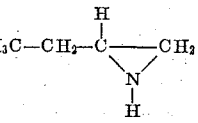

C. 1,2-butyleneimine

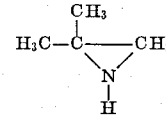

D. 2,2-dimethylethyleneimine

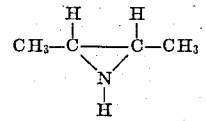

E. 2,3-butyleneimine

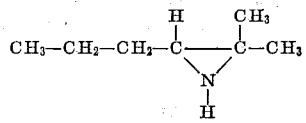

F. 1,1-dimethyl,2-n-propylethyleneimine

Other monomers capable of producing cationic polymers suitable for the practice of this invention are trimethyleneimine which has the structural formula:

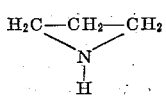

and its lower alkyl substituted derivatives in which one or more of the hydrogen atoms attached to a carbon atom is substituted by an alkyl group containing not more than 3 carbon atoms, i.e., methyl, ethyl and propyl.

Ethyleneimine, as well as many of its derivatives, may be prepared by any of several well-known methods such as are described in the "Journal of American Chemical Society," vol. 57, p. 2328 (1935), and Ber. 21 1094 (1888).

The polymerization of ethyleneimine and its derivatives is usually conducted at reduced temperatures using acid catalysts such as HCl and the like. The polymerization of the various monomers listed above is described in detail in the "Journal of Organic Chemistry," vol. 9, p. 500 (1944).

The linear polyimines are characterized by a long acyclic chain structure in which nitrogen atoms of imine groups are connected at intervals to carbon atoms. It will be recognized therefore that linear polyimines can be prepared not only by homopolymerization but also by condensation reactions with the elimination of a hydrohalide. Thus, ethylene dibromide or propylene dibromide can be condensed with diethylene triamine, triethylenetetramine, tetraethylenepentamine, and/or dipropylenetriamine to produce polyimines, and the present invention contemplates the employment of such materials as coagulants.

In general, the polyimines employed in the practice of the invention can be described as water-soluble polyimines in which imino (—NH) groups are attached to carbon atoms and recur every two to three atoms in a main linear chain, preferably containing not more than 6 carbon atoms in any side chain. Where imino groups are separated from each other by ethylene groups, the linear polyimines are referred to as polyethyleneimines. Where the imino groups are separated from each other by propylene groups, the linear polyimines are referred to as polypropyleneimines.

The cationic substituted quaternary onium compounds and their use as coagulants are described in U.S. Patent 2,236,930, the disclosure of which is incorporated herein by reference. The preferred quaternary onium compounds are the quaternary ammonium compounds. Several commercially available quaternary ammonium compounds are: soya trimethylammonium chloride, dimethyl ammonium chloride, tallow trimethyl ammonium chloride, lauryl trimethyl ammonium chloride, stearyl trimethyl ammonium chloride, and coconut trimethyl ammonium chloride. These compounds are manufactured and sold by the Armour Chemical Division under the trade name "Arquads."

Other cataionic chemical coagulants include those of the inorganic type such as aluminum sulfate (alum) ferrous sulfate, chloronated copperas (chlorine-oxidized ferrous sulfate), ferric sulfate, ferric chloride, sodium aluminate, etc. Of these, the most preferred substances are alum, sodium aluminate, ferrous sulfate, and ferric chloride. A typical sodium aluminate is a high purity sodium aluminate as produced by the method of Walker, U.S. Patent 3,002,809, the disclosure of which is incorporated herein by reference. Sodium aluminate products of around 99% purity have a $Na_2O:Al_2O_3$ molecular weight ratio from 1.11:1 to 1.25:1 as produced by this method.

Still other suitable cationics include cationic starch which is generally formed by reaction of starch with a suitable amine-containing material whereby an amino alkoxy group is produced.

Yet another class of cationic coagulants include addition-type polymers which in aqueous medium will form organic cations having a substantial number of positive charges distributed at a plurality of positions on the polymer. Generally, these materials have a molecular weight in excess of 100,000 and contain in a side chain a hydrophilic group possessing the ability to form the above-described positive charge. Typical members of this group are polyvinyl pyridine or other similar monomers having nitrogen-containing nuclei. Another specific material of this type is polyvinyl pyrrolidone. Salts of the above may also be employed.

Still other suitable cationics include the well-known vinyl benzyl quaternary ammonium compounds such as the homopolymers of vinyl benzyl quaternary ammonium salts or copolymers thereof formed by a copolymerization reaction with acrylamide, methacrylamide, etc. The vinyl benzyl quaternary materials are generally formed by chloromethylating polystyrene and subsequently substituting the chloro group with a tertiary amine to produce the corresponding nitrogen quaternary.

Other examples of cationic polymers suitable as a treating agent in the first step of the process of the invention includes homopolymers and water-soluble copolymers of aminoethyl acrylate hydrochloride, aminoethyl methacrylate hydrochloride, or substituted ammonium alkyl acrylates or methacrylates such as N-methyl or N,N-dimethyl-aminoalkyl acrylate or methacrylate wherein the alkyl groups contain 2-3 carbons or suitable materials. Other cationic polymers may be formed when the cationic monomer of the type just described is copolymerized with any one or more mono-ethylenically unsaturated monomers capable of vinyl polymerization such that the resulting copolymer is water-soluble or water-dispersible. Suitable monomers of this type which may be copolymerized with the cationic monomers include acrylamide, methacrylamide, acrylonitrile the lower alkyl esters of acrylic and methacrylic acids, vinyl methyl ether, etc.

The above list of materials are just a few of the available cationic coagulants which may be suitably employed in the practice of the instant invention. It is understood, of course, that other cationic substances may be used other than those listed above without departing from the scope of the invention.

The amounts of anionic and cationic polymers employed in the process of this invention has been found to be very critical in optimizing the efficiency of the coal wash water clarification process. It has been found that only by the process of this invention can a coal preparation plant optimize the clarification step in processing the wash water.

The amount of anionic polymer has been found to have substantial effect on the overall efficiency of the process. If too much anionic polymer is employed, the settling rate of the coal particles is too high. This excessively rapid settling rate results in plugging of the underflow which removes the settled solids, and, further, has been found to result in poor clarification of the aqueous supernate. Too rapid a settling rate results in coal particles dropping through the system, leaving behind the suspended colloidal clay and fine colloidal coal. Too slow a settling rate will cause carryover of particles into the wash water return line. Even if clarification is attempted by a dual treatment of anionic and cationic polymers, too much or too little of the anionic polymer will prohibit the supernate from being properly clarified. Accordingly, care must be taken to use only sufficient anionic polymer to form a floc, but not sufficient to agglomerate the flocs into rapidly-settling particles.

While the proper amount of anionic polymer may be determined for each individual plant, it has generally been found that uses of polymer resulting in settling rates in excess of 40 ft./hr. are unacceptable. It is preferred, for optimizing the process of this invention, to add only that amount of anionic polymer which will provide a settling rate of 20 ft./hr. or less. Therefore, it is a necessary step to determine the settling rate and adjust the amount of anionic polymer so that the settling rate does not exceed the 20 ft./hr. maximum.

Care must also be taken to insure that the settling rate is not too slow, since a very slow settling rate causes overflow of floc particles into the wash water return line. It has been determined that, for most settling operations, a minimum settling rate of approximately 1 ft./hr. is acceptable. If the settling rate is less than this minimum amount, the clarification unit will not be capable of handling the large volumes of water processed daily in these plants.

As stated above, the most important variable in determining the anionic polymer amount is the settling rate. A rough guide to aid in determining this amount is a range of suggested dosage levels, expressed in pounds of polymer per ton of dry solids. Normally, the proper settling rate will be achieved if the anionic polymer is added in an amount ranging from about 0.01 to about 1.0 pound of polymer per ton of dry solids. This range, of course, is only an approximation and the amount must be adjusted to fall within the range of the settling rates as defined above.

It is equally critical to employ the proper amount of cationic polymer if an efficient operation of the process of this invention is to be effected. Too much cationic polymer has been found to be harmful, not only because the use of gross amounts of this ingredient is expensive but, more important, because a highly-turbid supernate will result if an excess of this additive is employed. The minimum amount of cationic polymer to be used is also extremely important. It has been found that the minimum amount must be added if proper clarification of the aqueous supernate is to be achieved.

The principal function of the cationic material is to remove the colloidally suspended clay particles from the wash water. As stated above, these particles are kept in suspension by a double layer charge effect. This charge must be reduced in order to permit the particles to agglomerate and thereby settle from the suspension. Due to the many and varied coal processing plants in the United States, it is not feasible to set forth any particular dosage level which would be satisfactory for each and every coal wash water.

The amount of cationic polymer necessary to achieve the goal of proper clarification will depend upon two factors. First of all, the amount of clay suspended in the wash water must be determined, since different coal and water supply sources will result in various amounts of clay dissolved or suspended in the water. This variable can readily be determined by routine solids determination.

The second, and more important factor which effects the amount of cationic polymer necessary to practice the process of this invention is the critical mobility of the clay particles themselves. As mentioned above, the particles are suspended in the aqueous system because of a double layer effect. The clay particles have a residual negative charge on the surface of the particle, which charge repels the individual particles from each other. To further complicate the problem, various sources of clay will have differing amounts of charge on the surface. By way of example, a clay from a coal mine in West Virginia might have two or three times greater charge per unit of clay than a like amount of clay from a Pensylvania coal mine.

The particular charge existing on the surface of a clay particle has been defined as the particle mobility. In order to agglomerate the individual clay particles, or overcome the force of repulsion that exists between the particles, a certain portion of the mobility must be neutralized in order to permit a bridging between the particles of clay by a polymer. It has been discovered that effective coagulation and agglomeration of the clay particles can be achieved if the mobility, defined hereafter, is reduced by addition of the cationic polymer to a value of no greater than approximately —0.8. For convenience sake, the mobility as discussed hereinafter will be given as dimensionless numbers. It is to be understood, however, that mobility is in fact expressed as microns/second/volt/centimeters.

The function of the cationic polymer in the process of this invention is to reduce the mobility of the clay particles to the critical value of —0.8. In order for the particles to agglomerate, it is necessary to add sufficient cationic polymer to equal the net charge of the system furnished by the clay. This net charge may be calculated by multiplying the amount of suspended clay by the critical mobility of the clay. The critical mobility is defined as the actual mobility of the particles minus the mobility necessary to effect agglomeration, namely the above-mentioned —0.8. For example, if the clay mobility is —1.4, the critical mobility is —0.6.

Thus, it can be seen that the amount of cationic polymer will vary substantially between systems. If, for example, one particular wash water might contain 8 units of clay per volume and have a mobility of —1.8, the amount of cationic polymer which must be added to effectively clarify this system would then be equal to the product of the 8 units times the critical mobility. Another system might have a clay concentration of only 4 units, but the clay particles may have a mobility of —3.8. Thus it can be seen that the second system, which contains only half as much clay will, in fact, require 50% more cationic polymer since the product of the amount of clay times the critical mobility is 50% greater. In the first hypothetical example, this product was 8 units times a critical mobility of —1.0. In the second hypothetical example, the product was 4 units times a critical mobility of —3.

While it may appear that the determination of the mobility of a clay particle might involve substantial effort, it has been found that this analytical work results in substantial savings in processing spent coal wash water. Once the determination of the mobility of the clay particles has been made, it is possible to effectively clarify the wash water from the particular coal processing plant for as long a time as that particular coal source and water source is being employed. Thus, one mobility determination may serve for months or even years of practical application.

One satisfactory method for determining the amount of cationic polymer to be employed is to measure the mobility of various mixtures of clay and cationic polymer until the amount necessary to reduce the mobility to less than —0.8 has been found.

Determination of mobility of clay particles is known in the art and may be performed by anyone skilled in analytical technique. Reference is herein made to an article printed in the "Journal of American Water Works Association," vol. 54, No. 8, August, 1962, titled "Determination of the Mobility of Colloidal Particles By Microelectrophoresis" by A. P. Black and A. L. Smith. This article contains a good discussion of the theoretical and practical aspects of mobility determination.

EXAMPLES

In this example, a number of cationic and anionic materials were evaluated at a coal processing plant. The particular coal being processed at this plant was a deep mine coal. During the early portion of the trial, various amounts of cationic polymers were used alone without success in the wash water clarification unit. Only by the addition of excessively high amounts was a reasonable clarification of the wash water obtained. Similarly, an anionic polymer was used alone to attempt clarification of this wash water without success.

Next, a number of dual treatments were employed. Three different cationic polymers were employed in different trials. Cationic Polymer A was a condensation polymer of tetraethylenepentamine and epichlorohydrin. Cationic Polymer B was a condensation polymer prepared from ammonia and ethylene dichloride, while Cationic Polymer C was the methyl chloride quaternary complex of Cationic Polymer B. In each case, the anionic polymer of Example II was employed. Presented below in Table I are the results of these tests. In each case, the anionic polymer was added in an amount sufficient to give a satisfactory settling rate. Also, the cationic polymer was added in an amount slightly greater than the product of the amount of clay times its critical mobility, as defined above. As is readily apparent from the data presented in Table I below, the use of an anionic polymer followed by a cationic polymer was successful in reducing the turbidity of the clarified water to yield a clear supernate. In contrast, the use of a cationic polymer followed by an anionic polymer was completely ineffective in achieving the desired result.

TABLE I

| First Polymer Added | Second Polymer Added | Settling Rate (ft./hr.) | Turbidity (p.p.m.), Hellige |
|---|---|---|---|
| Cationic Polymer A | Anionic Polymer | 1.2 | 200+ |
| Anionic Polymer | Cationic Polymer A | 1.9 | 15 |
| Cationic Polymer B | Anionic Polymer | 1.5 | 200+ |
| Anionic Polymer | Cationic Polymer B | 1.7 | 5 |
| Cationic Polymer C | Anionic Polymer | 1.1 | 150 |
| Anionic Polymer | Cationic Polymer C | 1.7 | 5 |

In another series of experiments, the amount of anionic polymer added was varied to demonstrate the criticality of the floc formation requirements. Obviously, if no anionic polymer were to be added, no floc formation would take place and the clarification process would be wholly ineffective. The results presented below in Table II show a satisfactory clarification of coal mine wash water carried out in Run A according to the process of this invention. First, an anionic polymer was added in an amount sufficient to form a floc but insufficient to agglomerate the flocs into rapidly-settling particles. Then, an amount of cationic polymer was added to balance the charge as determined from the product of the amount of clay multiplied by the critical mobility thereof. As is evident, the turbidity and settling rates were completely satisfactory. In Run B, the amount of anionic polymer was decreased to the point where floc formation was insufficient. As can be seen, the effect on settling rate and turbidity was adverse. Also, in Run C, an excess amount of anionic polymer was added to the system. In this case, the settling rate increased significantly, thereby failing to adequately remove the suspended clay. Thus, it can be seen that the amount of anionic polymer is critical and care must be taken in selecting the proper amount if the satisfactory clarification of coal wash water is to be obtained.

TABLE II

| Run No. | Pounds of Anionic Polymer per Ton of Solids | Pounds of Cationic Polymer per Ton of Solids | Settling Rate (ft./hr.) | Turbidity (p.p.m.), Hellige |
|---|---|---|---|---|
| A | 0.11 | 1.1 | 4.5 | 15 |
| B | 0.007 | 1.1 | 0.25 | 100+ |
| C | 0.22 | 1.1 | 23.1 | 200+ |

In still another set of experiments, the amount of cationic polymer was varied in a similar manner as described above. The amount of anionic polymer found to be successful in the above Table II was employed in each run. The results of these runs are presented below in Table III. Data in the table clearly shows that effective clarification of coal wash water systems can only be accomplished by selection of the proper amount of cationic polymer. Run A, presented below, is identical to the run presented in Table II above according to the process of this invention. Run B, represents an attempted clarification using too little cationic polymer. In this case, the product of the amount of clay multiplied by the critical mobility was not balanced by the cationic polymer. Resulting adverse effects on turbidity are readily apparent. In Run C, below, an excess amount of cationic polymer was employed again without success.

TABLE III

| Run No. | Pounds of Anionic Polymer per Ton of Solids | Pounds of Cationic Polymer per Ton of Solids | Settling Rate (ft./hr.) | Turbidity (p.p.m.), Hellige |
|---|---|---|---|---|
| A | 0.11 | 1.1 | 4.5 | 15 |
| B | 0.11 | 0.55 | 4.5 | 400+ |
| C | 0.11 | 4.4 | 4.4 | 200+ |

In a preferred embodiment of the invention, it has been found that more efficient clarification of coal wash water systems can be effected if the total solids suspended therein is kept at no greater than 6% by weight. Several experiments were performed to demonstrate the effect of this embodiment. In the first experiment, a coal slurry having a solids content of 11.5% by weight was treated according to the process of this invention. While the supernate was satisfactorily clear, the settling rate was only approximately 3.34 feet per hour. An additional sample of this coal wash water was treated in another experiment after the slurry had been diluted with water to a concentration of 5.75% by weight solids. Using the same relative dosages on a solids basis of the anionic and cationic polymers, the settling rate was found to have increased to 20 feet per hour, a six-fold increase. Other experiments showed two or three times to as much as ten times greater effectiveness in removing coal fines and clay from coal wash water supplies, by maintaining the total solids content at a value of no higher than 6% by weight.

It will be apparent that various possible combinations of anionic and cationic polymers can be made without departing from the spirit of the invention. Depending upon the characteristics of the polymers, use thereof in the process of this invention will effect satisfactory removal of coal fines and clay from aqueous suspension thereof to provide a clear aqueous supernate.

Having thus described the invention, what is claimed is:

1. A process for removing coal fines and clay from an aqueous suspension thereof comprising the sequential addition of an anionic polymer followed by a cationic polymer, wherein the amount of anionic polymer is sufficient to form a floc, but insufficient to agglomerate said floc into rapidly-settling particles, and wherein the amount of cationic polymer is sufficient to balance the product of the amount of clay multiplied by the critical mobility thereof, and thereafter allowing said coal fines and said clay to settle from said suspension to provide a clear aqueous supernate.

2. The process of claim 1 wherein said anionic polymer is an acrylamide-sodium acrylate copolymer.

3. The process of claim 1 wherein the cationic polymer is selected from polyamines and polyamine quaternaries.

4. The process of claim 1 wherein the amount of coal fines and clay, calculated on a solids basis, is adjusted to less than 6% by addition of water prior to the sequential addition.

References Cited

UNITED STATES PATENTS 3,259,570   7/1966   Priesing et al. _____ 210—53

FOREIGN PATENTS 637,703   3/1962   Canada.

OTHER REFERENCES

Ruehrwein, R. A., et al., Mechanism of Clay Aggregation by Polyelectrolytes, Soil Science, 1952, vol. 73, pp. 485–492.

Wadsworth, M. E., et al., Flocculation of Mineral Suspensions With Coprecipitated Polyelectrolytes, Mining Engineering, Transactions AIME, August 1956, pp. 830–833.

MICHAEL E. ROGERS, *Primary Examiner.*